United States Patent
He et al.

(10) Patent No.: US 10,988,561 B2
(45) Date of Patent: Apr. 27, 2021

(54) METHOD FOR INDUSTRIAL PRODUCTION OF TRANS-BUTADIENE-ISOPRENE COPOLYMER RUBBER AND APPARATUS THEREFOR

(71) Applicants: QINGDAO UNIVERSITY OF SCIENCE AND TECHNOLOGY, Shandong (CN); SHANDONG HUAJU POLYMER MATERIALS CO., LTD., Shandong (CN); CHAMBROAD CHEMICAL INDUSTRY RESEARCH INSTITUTE CO., LTD., Shandong (CN)

(72) Inventors: Aihua He, Qingdao (CN); Yunsheng Ma, Binzhou (CN); Huafeng Shao, Qingdao (CN); Gang Yao, Binzhou (CN); Chenguang Liu, Qingdao (CN); Bo Luan, Binzhou (CN); Riguo Wang, Binzhou (CN)

(73) Assignees: QINGDAO UNIVERSITY OF SCIENCE AND TECHNOLOGY, Shandong (CN); SHANDONG HUAJU POLYMER MATERIALS CO., LTD., Shandong (CN); CHAMBROAD CHEMICAL INDUSTRY RESEARCH INSTITUTE CO., LTD., Shandong (CN)

(*) Notice: Subject to any disclaimer, the term of this patent is extended or adjusted under 35 U.S.C. 154(b) by 102 days.

(21) Appl. No.: 15/743,781

(22) PCT Filed: Nov. 15, 2016

(86) PCT No.: PCT/CN2016/105841
§ 371 (c)(1),
(2) Date: Jan. 11, 2018

(87) PCT Pub. No.: WO2017/161898
PCT Pub. Date: Sep. 28, 2017

(65) Prior Publication Data
US 2018/0201714 A1 Jul. 19, 2018

(30) Foreign Application Priority Data
Mar. 24, 2016 (CN) .......................... 201610173038.8

(51) Int. Cl.
*C08F 236/06* (2006.01)
*C08F 236/08* (2006.01)
(Continued)

(52) U.S. Cl.
CPC .............. *C08F 236/06* (2013.01); *C08C 4/00* (2013.01); *C08F 2/01* (2013.01); *C08F 2/02* (2013.01);
(Continued)

(58) Field of Classification Search
CPC .. C08F 236/06; C08F 2/02; C08F 2/01; C08F 236/08
See application file for complete search history.

(56) References Cited

U.S. PATENT DOCUMENTS

| 4,020,115 A | 4/1977 | Hargis et al. |
| 5,100,965 A | 3/1992 | Hsu et al. |

(Continued)

FOREIGN PATENT DOCUMENTS

| CN | 1117501 A | 2/1996 |
| CN | 1255442 C * | 5/2006 |

(Continued)

OTHER PUBLICATIONS

Nanostructured Conductive Polymers, 5.3.8, Polyacetylene/Carbon Nanotubes (ed. Ali Eftekhari), Wiley 2010 (Year: 2010).*

*Primary Examiner* — Catherine S Branch
(74) *Attorney, Agent, or Firm* — Oliff PLC

(57) ABSTRACT

A method for industrial production of a butadiene-isoprene copolymer rubber having a trans-1,4-structure (TBIR) and an apparatus for implementing the method. The production method includes: pumping a predetermined amount of a butadiene and an isoprene into a polymerization reactor, and performing bulk polymerization in the presence of a catalyst to obtain TBIR; performing extrusion, devolatilization, granulation and drying on the produced TBIR, and then packaging the produced TBIR; and separating unreacted monomers by a recovery and separation device followed by separately refining the unreacted monomers, and then returning the unreacted monomers to a batching device or a storage tank. The production apparatus has a recovery and refining unit, a polymerization unit, a post-treatment unit and a utility unit. By the production apparatus and the production method industrial production of TBIR by bulk polymerization is realized.

8 Claims, 1 Drawing Sheet

(51) Int. Cl.
| | |
|---|---|
| C08F 2/01 | (2006.01) |
| C08F 2/02 | (2006.01) |
| C08F 2/42 | (2006.01) |
| C08F 4/642 | (2006.01) |
| C08C 4/00 | (2006.01) |
| B01D 3/00 | (2006.01) |
| B01D 3/14 | (2006.01) |
| B01J 8/00 | (2006.01) |

(52) U.S. Cl.
CPC ............ *C08F 2/42* (2013.01); *C08F 4/642* (2013.01); *C08F 236/08* (2013.01); *B01D 3/009* (2013.01); *B01D 3/14* (2013.01); *B01J 8/008* (2013.01)

(56) References Cited

U.S. PATENT DOCUMENTS

| | | | | |
|---|---|---|---|---|
| 5,432,242 | A * | 7/1995 | Baron | C08F 6/02 526/68 |
| 5,844,044 | A | 12/1998 | Sandstrom et al. | |
| 6,461,573 | B1 * | 10/2002 | Yamamoto | B01J 8/0015 422/109 |
| 6,723,804 | B1 * | 4/2004 | Battiste | C08F 10/00 526/59 |
| 7,351,776 | B2 * | 4/2008 | Tartamella | C08F 36/04 525/53 |
| 2003/0060549 | A1 * | 3/2003 | Takamura | C08J 3/21 524/394 |
| 2005/0222348 | A1 | 10/2005 | Ricci et al. | |
| 2006/0235130 | A1 * | 10/2006 | Hanner | C08L 51/006 524/457 |
| 2007/0019190 | A1 * | 1/2007 | Marrow | B01J 19/0006 356/301 |
| 2011/0172382 | A1 * | 7/2011 | Yeh | B01J 19/002 526/282 |
| 2018/0016362 | A1 * | 1/2018 | Sugimura | C08K 3/011 |

FOREIGN PATENT DOCUMENTS

| | | | |
|---|---|---|---|
| CN | 1847272 | A | 10/2006 |
| CN | 102050968 | A | 5/2011 |
| CN | 103204973 | A * | 7/2013 |
| CN | 103387641 | A | 11/2013 |
| CN | 103897080 | A | 7/2014 |
| CN | 104628914 | A | 5/2015 |
| CN | 105601814 | A | 5/2016 |
| DE | 23 31 921 | A1 | 1/1975 |
| GB | 2 029 426 | A | 3/1980 |
| JP | S60-042412 | A | 3/1985 |
| JP | H02-60907 | A | 3/1990 |
| WO | 97/23521 | A1 | 7/1997 |
| WO | 03/022919 | A1 | 3/2003 |

OTHER PUBLICATIONS

Tao et al., "Study of a Novel Fourth-generation Supported Ziegler-Natta Catalyst for Propylene Polymerization: Relationship between Catalyst Structure and Polymerization Properties," China Petetroleum Process and Petrochemical Technology, 2-15, vol. 17, No. 1, pp. 39-47. (Year: 2015).*
Martin, "Twin Screw Extruders as Continuous Mixers for Thermal Processing: a Technical and Historical Perspective," AAPS PharmSciTech, 17(1): 3-19 (2016). (Year: 2016).*
Machine Translation of CN 103204973. (Year: 2013).*
English machine translation of CN 1255442C. (Year: 2006).*
Feb. 23, 2017 International Search Report issued in International Patent Application No. PCT/CN2016/105841.
"Kinetic investigation of butadiene-isoprene copolymerization with supported titanium catalyst"; China Elastometrics; 2002; vol. 12; No. 1; pp. 1-6.
"Kinetic investigation of butadiene-isoprene copolymerization with supported titanium catalyst in the autoclave"; China Elastomerics; 2003; vol. 13; No. 2; pp. 1-4.
"Synthesis of High trans-1 ,4-Butadiene-Isoprene Copolymers by Supported Titanium Catalysts"; Acta Polymerica Sinica; 2002; pp. 19-24.
"High trans-1,4-butadiene-isoprene copolymer"; China Synthetic Rubber Industry; 2002; vol. 25; No. 5 pp. 321-326.
"Synthesis of high trans-1,4-butadiene-isoprene copolymers with supported titanium catalysts under hydrogen regulation"; China Synthetic Rubber Industry; 2011; vol. 34; No. 3; pp. 186-189.
"Progress on Research Application of High Trans-butadiene-iosprene Copolymer(TBIR)Rubber"; Special Purpose Rubber Products; 2004; vol. 25; No. 6; pp. 49-58.
"Effect of molecular weight and its distribution on properties of High trans-1,4-butadiene-isoprene copolymer rubber"; China Rubber Industry; 2010; pp. 723-729.

* cited by examiner

METHOD FOR INDUSTRIAL PRODUCTION OF TRANS-BUTADIENE-ISOPRENE COPOLYMER RUBBER AND APPARATUS THEREFOR

TECHNICAL FIELD

The invention relates to a preparation technology of a trans-1,4-butadiene-isoprene copolymer rubber (TBIR) in the petrochemical industry, specifically a method for industrial production of bulk-polymerized TBIR and an apparatus for implementing the method.

BACKGROUND TECHNOLOGY

The trans-1,4-butadiene-isoprene copolymer rubber (TBIR) is a new generation of rubber materials produced by the copolymerization of isoprene monomer and butadiene monomer, comparing with the ordinary natural rubber, the main feature of this rubber is its excellent flex fatigue resistance, low rolling resistance, low heat build-up and good abrasion resistance, so it is an excellent material for producing high performance, energy conservation and environment protection. Thanks to its outstanding dynamic performance, fatigue resistance and low heat build-up, it also has bright prospects in the manufacturing of all kinds of shock-reducing rubber materials. The Patents (U.S. Pat. No. 5,100,965, WO9723521, U.S. Pat. No. 402,115, U.S. Pat. No. 5,844,044, UK2029426) disclosed the excellent physical mechanics performance of butadiene-isoprene copolymers having a high trans-1,4-structure, especially its fatigue resistance and good crack growth resistance, and therefore it is an ideal rubber for the development of high performance tires.

Comparing with the polymers of cis-1,4 structure, the trans-1,4-polydiolefin is normally a crystalline plastics at room temperature, and to produce elastomeric materials requires increasing its sulfur content or preparing it with other rubbers and then going through the process of co-vulcanization (ZL 95110352.0, ZL 200610043556.4).

The syntheses of TBIR usually adopts coordination polymerization catalysts such as allyl nickel catalyst system, $TiCl_4/VOCl_3/Al(i-Bu)_3$ catalyst system, allyl chromium-silicate catalyst system, lanthanoid metal compounds catalyst system [Dokl. Akad. Nauk SSSR, 1976; Ger. Pat. 2331921, 1975; Dokl. Akad. Nauk SSSR, 1973; Prom-st Sint Kauch, 1982; JP1990-60907, 1990; US 2005/0222348], and anionic alkyllithium system [U.S. Pat. No. 4,020,115, 1997; UK Pat 2029426, 1980; U.S. Pat. No. 5,100,965, 1992]. But the systems above have the problems such as catalytic inefficiency or low trans structure content or other problems not mentioned, for example, the trans structure content of the U.S. Pat. No. 4,020,115 is just below 80%. In the meantime, most of them adopt solution polymerization by using solvents like methylbenzene, the post-processing programs such as the recovery and refining of solvents are cumbersome and complex.

By using supported titanium system catalysts [JP1985-42412, 1985; China Elastomerics, 2002, 2003; Acta Polymerica Sinica, 2002; China Synthetic Rubber Industry, 2002, 2011; China Rubber Industry, 2010], the adjustable TBIR can be composed whose trans structure content is more than 97% and the monomer composition in the copolymer can be adjusted. Its catalytic efficiency is high, which can reach 30000 times. The Chinese patent No. ZL201210138621.7 disclosed a butadiene-isoprene copolymer rubber having a trans-1,4-structure which contains more than 90% trans structure, the proportion of butadiene and isoprene within the copolymer are 0.5-80% and 20-99.5% respectively, and the composition of comonomers can be adjusted. Meanwhile, two kinds of its monomers' microstructure sequence distribution can be graded distribution or uniform distribution. The patent does not refer to the rubber's industrial producing process and process apparatus therefore it cannot realize the industrial production. Moreover, the patent does not refer to and solve the problems of the post-treatment of polymers, the addition of ingredient systems, and extrusion and granulation. But a large amount of wastewater was generated during the coacervation process of the post-treatment of traditional rubber, and its energy consumption is very high.

To overcome and solve the above-mentioned problems of TBIR in the polymer microstructure controlling, polymerization process, polymerization method and its industrialization, the present invention provides a method for industrial production of trans-1,4-butadiene-isoprene copolymer rubber and an apparatus for implementing the method.

Content of Invention

In view of the above, one of the main purposes of the invention is to provide a method for industrial production of a butadiene-isoprene copolymer rubber having a trans-1,4-structure (TBIR).

The second main purpose of the invention is that to provide an apparatus for implementing the method for producing the above-mentioned TBIR.

The third main purpose of the invention is that to provide a post-treatment technology of extrusion, devolatilization and granulation of TBIR, which reduces the energy consumption and the large amount wastewater generated in the traditional bulk polymerization which uses polymer slurry steam wet coagulation process.

In order to achieve these above purposes, the invention adopts a industrial production technology which is the bulk technology for industrial production of a butadiene-isoprene copolymer rubber having a trans-1,4-structure, the technology is as below:

(1) After the polymerization apparatus is vacuumed and the water and oxygen within is replaced fully by the nitrogen, the refined isoprene monomer, butadiene monomer, cocatalyst, electron donor, primary catalyst and hydrogen are sent to the polymerization reactor in order successively according to the predetermined dosage respectively through the batching device. The mole ratio of titanium and/or vanadium element within the primary catalyst to monomer is $(0.01~100) \times 10^{-5}:1$, the mole ratio of Al element in the co-catalysts to the titanium and/or vanadium element within the main catalyst is 1~200:1, the mole ratio of hydrogen to the titanium and/or vanadium element within the main catalyst is 1~2000:1, the copolymerization temperature is 20~100° C., the feed mole ratio of butadiene to isoprene is 0.01~50:100, the mole ratio of electron donor to the titanium and/or vanadium element within the main catalyst is 0-10:1, the duration of constant temperature polymerization is 1~48 hours;

(2) After the polymerization reaches the predetermined time, the polymer system is transferred to the termination device through polymerization device pipeline, meanwhile add the termination agent to the termination device to make the polymerization be terminated;

(3) The polymer system is transferred to the extrusion and devolatilization device by termination device, meanwhile add the anti-aging agent and/or rubber auxiliary agent of a certain dose to the extrusion and devolatilization device; the unreacted butadiene and isoprene monomers are reduced pressure removed by the extrusion and devolatilization device, then the butadiene and isoprene are separated and refined by separation device and refining device, and are transferred to the polymerization apparatus or to the storage tank for spare;

(4) After the polymers are granulated by the extrusion and devolatilization device, the granular butadiene-isoprene copolymer rubber having a trans-1,4-structure (TBIR) is produced. The polymer granules are metered and packaged after drying.

According to the method of this invention, the butadiene and isoprene monomers in raw materials are further refined respectively before the step (1).

According to the method of this invention, after the unreacted monomers in step (3) are recovered, they will be separated and refined by the separation and refining device, then they are returned by the batching device to the polymerization reactor for polymerizing or be pumped to the monomer storage tank respectively.

The described method for industrial production of butadiene-isoprene copolymer rubber having a trans-1,4-structure, can adopts the batch polymerization method or the continuous polymerization method.

According to the method of this invention, the trans-1,4-structure mole content in the prepared copolymer rubber TBIR is above 85%, the butadiene mole content within it is 0.1-60%, the Mooney viscosity (100° C., 3+4 min) of it is 20-120, the fusion temperature is below 50° C.

In order the realize the industrial production by the method in this invention, the industrial production comprises a recovery and refining unit, a polymerization unit, a post-treatment unit and a utility unit, the invention provides a whole set of device to implement this method:

The refining unit: comprises a treating column, etc., it is used to refine the materials and monomers and transfer them to the polymerization apparatus;

The recovery and separation device: comprises a recovery storage tank, a gas holder, a separate column, etc., which are used to separate the recovered monomers and transfer them to the polymerization apparatus or to the storage tank for spare;

Batching device: comprises a metering and pumping device of butadiene monomers and isoprene monomers; a preparing, metering and pumping apparatus of primary catalyst, electron donor and cocatalyst; a hydrogen metering apparatus;

Polymerization apparatus: can be one polymerization reactor singly used or used by the combination of two or more polymerization reactors of different types or same type, the polymerization reactor can be one or two or more kind of the tank polymerization reactor, tower polymerization reactor, uniaxial horizontal polymerization reactor, biaxial horizontal polymerization reactor, loop tubular polymerization reactor or tubular polymerization reactor.

Monitor and control unit: comprises a temperature online monitor, a pressure online monitor, a material online detector and material online controller, the material online detector comprises a online viscosity detector and a online concentration detector; the material online controller comprises a material electromagnetic valve and a computer controller.

Termination device: is a double screw extruder; the extrusion and devolatilization device comprises the extruder, granulator, drum wind dryer and vacuum pump, the extrusion and devolatilization device is used to remove the unreacted monomers and to mix the polymer with anti-aging agent and/or rubber auxiliary agent, and then carry out the extrusion, granulation and drying of the products; the post-treatment unit comprises the conveying, metering and packaging of the polymers, and also comprises the preparing, metering and conveying of termination agent, anti-aging agent and rubber auxiliary agent.

The utility unit comprises a cold, hot water and/or steam pipeline apparatus, which is used for controlling the temperature of the polymerization device, and a vacuum and high purity nitrogen apparatus which can replace the polymerization system before the polymerization and and during overhaul.

The described primary catalyst is the supported titanium and/or vanadium catalyst, among which the titanium and/or vanadium element occupies 1%~5% of the primary catalyst's total mass, the internal electron donor occupies 0%~20% of the primary catalyst's total mass; the carrier of primary catalyst is one kind of $MgCl_2$, $MgBr_2$, $MgI_2$, $SiO_2$; the titanium compound is one kind of $TiCl_4$, $TiBr_4$ or $TiI_4$; the vanadium compound is one kind or a compound of two or more kinds of $VCl_3$, $VBr_3$, $VOCl_3$, $VOBr_3$, $VCl_4$, $VBr_4$, $V_2O_5$; the inner electron donor is one kind or a compound of two or more kinds of ester, ether, ketone and anhydride compounds.

The described cocatalyst is one kind or a compound of two or more kinds of triethyl aluminum, tri-isobutyl aluminum, dimethylaluminium chloride, methyl aluminum dichloride, diethyl aluminium chloride, ethylaluminum dichloride, diisobutylaluminum chloride, isobutylaluminum dichloride, diethylaluminum hydride, ethylaluminum hydride, isobutyl aluminum hydride, di-isobutyl aluminum hydride.

The described electron donor is one kind or a compound of two or more kinds of phosphate ester, ether, ketonic, anhydride, phenolic, amine, silane compounds.

The described polymerization reactor cooling sleeve is used to control the polymerization temperature, the copolymerization temperature is 20~100° C.

The described reaction time is 2~48 hours and can be adjusted according to the fractional conversion and product quality requirements.

The described extrusion and devolatilization system adopts one kind of single screw extruder, co-rotating twin screw extruder, counter-rotating twin-screw extruder or horizontal drying extruder.

The described extruders can be used in series or in parallel of one or two or more orders, they can be used in series connection to reduce the violate content; and they can also be used in parallel connection to increase the output.

The post-treatment unit described in this invention, when the polymerization ends, the polymerization system enters the termination device and meanwhile add termination agent to the polymerization system in the device, such as the termination agent is one kind or a compound of two or more kinds of carbon monoxide, carbon dioxide, nitrogen, air, water, alcohol which contains 4-8 carbon atoms, acid which contains 4-8 carbon atoms, ketone which contains 4-8 carbon atoms, amine which contains 4-8 carbon atoms, hydroxybenzene which contains 4-8 carbon atoms. The mole ratio of titanium and/or vanadium element within the termination agent and primary catalyst is 1~200:1, they are used to inactivate the active center within the polymerization system. The inactivated polymerization system is transferred to the extrusion and devolatilization device through the pipeline, in the meantime, the anti-aging agent can be added in the feeding position of the extruding and devolatilization machine, the agent is one kind or a compound of two or more kinds of 4010NA, MB, 2264, 264, MBZ, 800A, 1010A, 1010, 168, DSTP, 626, 4020 and 1076, the weight ratio of anti-aging agent to copolymer rubber TBIR is 0.01~1:100, the rubber auxiliary agent can also be added to it, such as one kind or a compound of two or more kinds of olefin, aromatic oil, naphthenic oil, C5 resin, octadecanoic acid, calcium stearate, dolomol, nihil album, silicon dioxide, carbon black or the aforementioned modified derivatives; the weight ratio of the rubber auxiliary agent to TBIR is 1~50:100.

The unreacted monomers are recovered by the extrusion and devolatilization device and after separated and refined by the separation and refining device, can be returned to the polymerization apparatus or to the storage tank for spare. The polymers are blended with anti-aging agent and/or rubber auxiliary agent to produce the granules by extruder, the granules are metered and packaged after drying.

By the means of method and apparatus above, the present invention can achieve the industrial production of a butadiene-isoprene copolymer rubber having a trans-1,4-structure (TBIR).

SPECIFIC EMBODIMENTS

Figure 1:
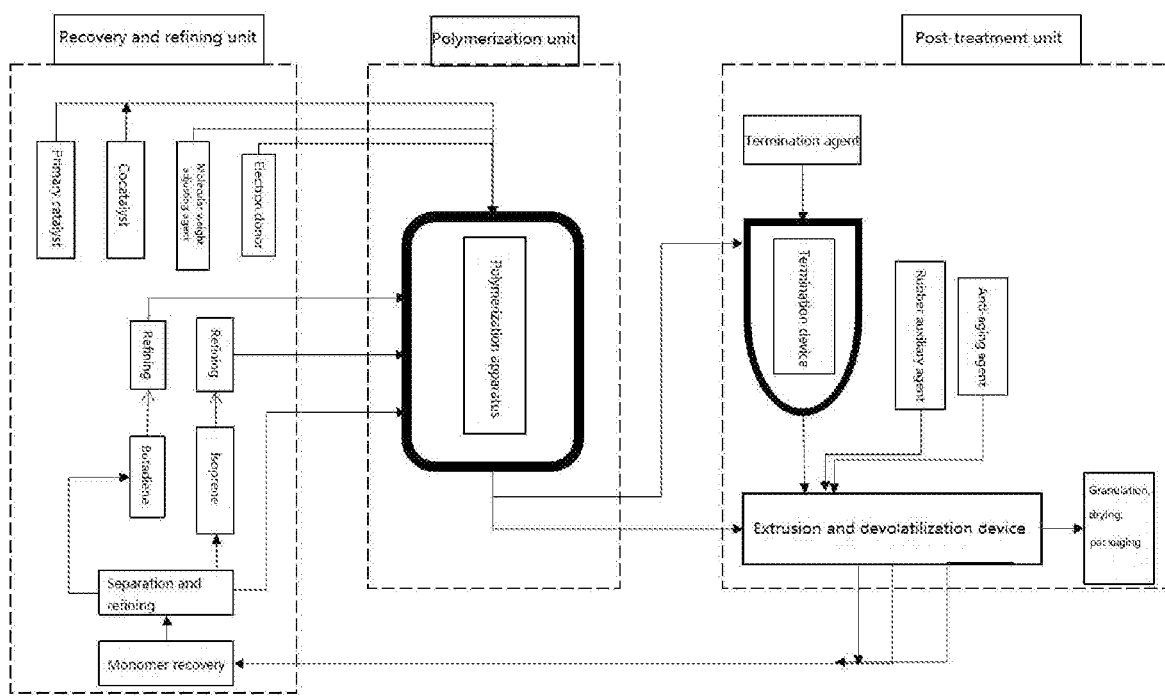
FIG. 1 Production process flow block diagram

In order to better explain the production process and the workflow of production apparatus in this invention, and to elaborate the techniques, features and achieved aims realized by the invention, the following further clarifies the invention with the specific embodiments.

The raw materials used in the embodiments of this invention are:

Butadiene, Sinopec Qilu Petrochemical Company, polymer grade, purity>99.0%; isoprene, Sinopec Shanghai Petrochemical Co., Ltd., polymer grade, purity>99.0%; supported titanium catalyst, self-made, $MgCl_2$-supported $TiCl_4$ catalyst, titanium content is 3.2 wt %; supported vanadium catalyst, self-made, $MgCl_2$-supported $VOCl_3$ catalyst, vanadium content is 3.5 wt %; tri-isobutyl aluminum, triethyl aluminum, self-made, purity is 98%; hydrogen, Linzi Auxiliaries Factory, purity is 99.99%; anti-aging agent 264, 2264, technical grade, Shanghai Chemson Chemicals Co., Ltd.; ethanol, propanol, technical grade, Laiyang Chemical Factory. Other things such as molecular weight regulator, electron donor, rubber auxiliary agent and anti-aging agent are bought from market.

Embodiment 1

After a high-pressure tank reactor with a double helical ribbon agitator blade is vacuumed to remove the water oxygen within, adding the following materials of certain dose into the reactor successively through the batching system: butadiene (Bd) monomer of 120 Kg, isoprene monomer (Ip) of 2300 Kg, tri-isobutyl aluminum (Al) of 13 Kg, supported titanium catalyst (Ti) of 1000 g and hydrogen, among which the Ti content in supported titanium catalyst is 3.2 wt %, Al/Ti=100 (mole ratio), the hydrogen is 180 g. The polymerization is proceeded at 80° C. for 10 h. After the polymerization is completed, the polymer system is transferred to the terminating twin-screw extruder by the pipeline and added termination agent ethanol of 2.8 Kg into it, then stir them fully until they are well mixed. After that, the terminated polymer system is transferred to the twin-screw extruding and devolatilization machine, and 5.00 Kg anti-aging agent 264 is added into it through the feeding inlet of the twin-screw extruding and devolatilization machine, the unreacted butadiene and isoprene monomers are vacuumed and removed by the extrusion and devolatilization device of the machine. The products, after being extruded by the machine and granulated, have been produced 530 Kg weighed after drying. By the test, the mole content of butadiene unit in the TBIR obtained is 21%, the trans-1,4-structure mole content in the copolymer is more than 90%, the Mooney viscosity (3+4 min) is 58 at 100° C.

Embodiment 2

After a high-pressure tank reactor with a double helical ribbon agitator blade is vacuumed to remove the water oxygen within, adding the following materials of certain dose into the reactor successively through the batching system: butadiene (Bd) monomer of 220 Kg, isoprene monomer (Ip) of 604 Kg, tri-isobutyl aluminum (Al) of 150 g, supported titanium catalyst (Ti) of 200 g, electron donor ether of 0.01 mol, hydrogen of 12 g. The polymerization is proceeded at 30° C. for 48 h. After the polymerization is completed, the polymer system is transferred to the terminating twin-screw extruder by the pipeline and added termination agent ethanol of 60 g into it, then stir them fully until they were well mixed. After that, the terminated polymer system is transferred to the twin-screw extruding and devolatilization machine, and add 2.1 Kg anti-aging agent 264, 50 Kg rubber auxiliary agent aromatic oil and 50 Kg silicon dioxide into it through the feeding inlet of the twin-screw extruding and devolatilization machine, the polymer, anti-aging agent and rubber auxiliary agent are mixed fully through the extruding and devolatilization machine. The unreacted butadiene and isoprene monomers are vacuumed and removed by the extrusion and devolatilization device of the machine. The products, after being extruded by the machine and granulated, have been produced 304 Kg weighed after drying. By the test, the mole content of butadiene unit in the TBIR obtained is 50%, the trans-1,4-structure mole content in the copolymer is more than 90%, the Mooney viscosity (3+4 min) is 85 at 100° C.

Embodiment 3

A tank reactor with a double helical ribbon agitator blade (caldron 1) is connected to a horizontal reactor (caldron 2) in series, after being vacuumed to remove the water oxygen within, certain dose of the following materials are added into the caldron 1 through the batching system: butadiene (Bd) monomer of 360 Kg, isoprene monomer (Ip) of 2300 Kg, tri-isobutyl aluminum (Al) of 10 Kg, supported titanium catalyst (Ti), electron donator and hydrogen, among which the titanium catalyst is 1.5 Kg, the electron donor tetrahydrofuran is 0.1 mol, the hydrogen is 20 g. The stirring speed of polymerizer is 80 RPM, the agitated polymerization is reacted at 50° C. for 2 h, after that, the polymer system is transferred by the pipeline system to the caldron 2. The stirring speed of the caldron 2 is 50 RPM, the polymerization is reacted at 60° C. for 5 h. After that, the polymer system is transferred to the terminating twin-screw extruder, and add 450 g termination agent ethanol into it, then stir them fully until they are well mixed to terminate the polymerization. After that, the terminated polymer system is transferred to the twin-screw extruding and devolatilization machine, and 2.0 Kg anti-aging agent 264 is added into it through the feeding inlet of the twin-screw extruding and devolatilization machine, the unreacted butadiene and isoprene monomers are vacuumed and removed by the extrusion and devolatilization device of the machine. The products, after being extruded by the machine and granulated, have been produced 1580 Kg weighed after drying. By the test, the mole content of butadiene unit in the TBIR obtained is 36%, the trans-1,4-structure mole content in the copolymer is 96%, the Mooney viscosity (3+4 min) is 92 at 100° C.

Embodiment 4

In addition to adding 400 g of hydrogen, other steps are the same as those of Embodiment 3. The final product is 1440 Kg of granular butadiene-isoprene copolymer rubber having a trans-1,4-structure (TBIR). By the test, the mole content of butadiene unit in the TBIR obtained is 35%, the trans-1,4-structure mole content in the copolymer is 93%, the Mooney viscosity (3+4 min) is 20 at 100° C.

Embodiment 5

Except for the rubber auxiliary agent naphthenic oil of 580 Kg and silicon dioxide of 300 Kg added through the inlet of twin-screw extruding and devolatilization machine, other steps are the same as those of Embodiment 3. The final product is granular trans-1,4-butadiene-isoprene copolymer rubber which contains naphthenic oil and auxiliary agent, the weight of the final product is 2380 Kg. By the test, the mole content of butadiene unit in the TBIR obtained is 35%, the trans-1,4-structure mole content in the copolymer is 93%, the Mooney viscosity (3+4 min) is 105 at 100° C.

Embodiment 6

In addition to adding 1.02 Kg of electron donor 1, 3-dimethoxy propane, other steps are the same as those of Embodiment 3. The weight of final obtained product is 1568 Kg. By the test, the mole content of butadiene unit in the TBIR obtained is 26%, the trans-1,4-structure mole content in the copolymer is 96%, the Mooney viscosity (3+4 min) is 95 at 100° C.

Embodiment 7

After a horizontal reactor is vacuumed to remove the water oxygen within, adding the following materials of certain dose into the reactor successively through the batching device: butadiene (Bd) monomer of 500 Kg, isoprene monomer (Ip) of 2450 Kg, triethyl aluminum (Al), supported titanium catalyst (Ti), hydrogen and electron donor. Among which the supported titanium catalyst is 1.5 Kg, the content of internal electron donor di-n-butyl ortho-phthalate is 12 wt %, Al/Ti=50 (mole ratio), the hydrogen is 160 g, electron donor 2, 2-dimethoxy propane is 0.1 mol. The polymerization is proceeded at 60° C. for 8 h. After the polymerization is completed, the polymer system is transferred to the terminating twin-screw extruder by the pipeline and added termination agent ethanol of 4.5 Kg into it, then stir them fully until they are well mixed. After that, the terminated polymer system is transferred to the twin-screw extruding and devolatilization machine, and 2.44 Kg anti-aging agent 2264 and 25.0 Kg rubber auxiliary agent naphthenic oil are added into it through the feeding inlet of the twin-screw extruding and devolatilization machine, the polymer, anti-aging agent and rubber auxiliary agent are mixed fully through the extruder. The unreacted butadiene and isoprene monomers are vacuumed and removed by the devolatilization device. After being extruded by the machine and granulated, the products are dried, weighed and packed successively, then the final product is granular trans-1,4-butadiene-isoprene copolymer rubber which contains naphthenic oil, the weight of the final product is 1800 Kg. By the test, the mole content of butadiene unit in the TBIR obtained is 34%, the trans-1,4-structure mole content in the copolymer is more than 93%, the Mooney viscosity (3+4 min) is 62 at 100° C.

Embodiment 8

The polymerization apparatus is two horizontal reactors in series, the reactors' internal diameter is 2 m, the length is 6 m, there are provided inside with propeller paddle and jacket which are used to transfer the materials forcibly and conduct heat. The first horizontal reactor was vacuumed by the vacuum nitrogen system to remove its water oxygen, and then add the following materials of certain dose into it successively through the batching system: butadiene (Bd) monomer of 400 Kg, isoprene monomer (Ip) of 2600 Kg, tri-isobutyl aluminum (Al), supported vanadium catalyst (V) and hydrogen, among which the Al/Ti=200 (mole ratio), the hydrogen is 50 g, the content of internal electron donor diisobutyl phthalate is 12 wt %. The polymerization of polymer system is proceeded in the first horizontal reactor at 40° C. for 4 h. After that, the polymer system is transferred to the second horizontal reactor and the polymerization is proceeded at 60° C. for 4 h, then the polymer system is transferred to the terminating twin-screw extruder by the pipeline and added termination agent propanol of 54 g into it, then stir them fully until they are well mixed. After that, the terminated polymer system is transferred to the twin-screw extruding and devolatilization machine, and 45 g anti-aging agent 2264 and 100 Kg rubber auxiliary agent carbon black are added into it through the feeding inlet of the twin-screw extruding and devolatilization machine, the unreacted monomers are recovered through recovery unit and refined for spare. After being granulated, the products are dried, weighed and packed successively and put into product warehouse, then the final product is granular trans-1,4-butadiene-isoprene copolymer rubber which contains carbon black, the weight of the final product is 1900 Kg. By the test, the mole content of butadiene unit in the TBIR obtained is 28%, the trans-1,4-structure mole content in the copolymer is more than 90%, the Mooney viscosity (3+4 min) is 78 at 100° C.

The invention claimed is:

1. A method for industrial production of a bulk-polymerized butadiene-isoprene copolymer rubber having a trans-1, 4-structure, the method comprising:
vacuuming a polymerization apparatus and replacing water and oxygen within the polymerization apparatus fully with nitrogen,
subsequent to the vacuuming and replacing, sending refined isoprene monomer, butadiene monomer, cocatalyst, electron donor, primary catalyst and hydrogen to the polymerization apparatus for bulk polymerization of the butadiene and isoprene according to a respective predetermined dosage through a batching device, wherein a mole ratio of titanium and/or vanadium element within the primary catalyst to monomer is $(0.01\text{-}100) \times 10^{-5}:1$, a mole ratio of Al element in the cocatalyst to the titanium and/or vanadium element within the primary catalyst is 1-200:1, a mole ratio of hydrogen to the titanium and/or vanadium element within the primary catalyst is 1-2000:1, a copolymerization temperature is 20-100° C., a feed mole ratio of butadiene to isoprene is 0.01-50:100, a mole ratio of the electron donor to the titanium and/or vanadium element within the primary catalyst is 0.1-10:1, and a duration of constant temperature polymerization is 2-48 hours, wherein the polymerization of the butadiene and isoprene occurs in the absence of a solvent;

after the polymerization reaches a predetermined time, transferring a produced polymer system to a termination device through a polymerization device pipeline, wherein a termination agent is added to the termination device to cause termination of the polymerization;

subsequently transferring the polymer system from the termination device to an extrusion and devolatilization device, wherein an antioxidant and a rubber auxiliary agent of a predetermined dose is added to the extrusion and devolatilization device; removing unreacted butadiene and isoprene monomers by the extrusion and devolatilization device under reduced pressure, then separating and refining the butadiene and isoprene monomers with a separation device and a refining device, and transferring the separated and refined butadiene and isoprene monomers to the polymerization apparatus or to a storage tank;

granulating the polymers by the extrusion and devolatilization device to produce granular butadiene-isoprene copolymer rubber having a trans-1,4-structure (TBIR), drying the granular butadiene-isoprene copolymer rubber to dried polymer granules, and then metering and packaging dried the polymer granules, wherein the primary catalyst is a titanium and/or vanadium catalyst supported on a carrier, among which the titanium and/or vanadium element occupies 1%-5% of the primary catalyst's total mass, and an internal electron donor occupies 0.1%-20% of the primary catalyst's total mass; and the carrier of the primary catalyst is selected from $MgCl_2$, $MgBr_2$, $MgI_2$, and $SiO_2$;

the titanium catalyst is a compound selected from $TiCl_4$, $TiBr_4$ and $TiI_4$;

the vanadium catalyst is a compound selected from $VCl_3$, $VBr_3$, $VOCl_3$, $VOBr_3$, $VCl_4$, $VBr_4$, $V_2O_5$, and mixtures thereof;

the internal electron donor is a compound selected from ester, ether, ketone, anhydride compounds, and mixtures thereof;

the cocatalyst is a compound selected from triethyl aluminum, tri-isobutyl aluminum, dimethylaluminium chloride, methylaluminum dichloride, diethyl aluminium chloride, ethylaluminum dichloride, diisobutylaluminum chloride, isobutylaluminum dichloride, diethylaluminum hydride, ethylaluminum hydride, isobutyl aluminum hydride, di-isobutyl aluminum hydride and mixtures thereof;

wherein the electron donor is a compound selected from phosphate ester, ether, ketonic, anhydride, phenolic, amine, silane compounds, and mixtures thereof;

wherein the termination agent is a compound of selected from carbon monoxide, carbon dioxide, nitrogen, air, water, alcohol that contains 4-8 carbon atoms, acid that contains 4-8 carbon atoms, ketone that contains 4-8 carbon atoms, amine that contains 4-8 carbon atoms, hydroxybenzene that contains 4-8 carbon atoms, and mixtures thereof;

the mole ratio of termination agent to titanium and/or vanadium element within the primary catalyst is 1-200:1;

the antioxidant is a compound selected from N-Isopropyl-N'-phenyl-1,4-phenylenediamine, 2-Mercaptobenzimidazole, 2,2'-Methylenebis(6-tert-butyl-4-methylphenol), Butylated Hydroxytoluene, 2-Mercaptobenzimidazole zinc salt, Pentaerythritol tetrakis(3-(3,5-di-tert-butyl-4-hydroxyphenyl)propionate), Tris(2,4-di-tert-butylphenyl) phosphite, Distearyl thiodipropionate, Bis-(2,4-di-tert-butyl-pheny)-phosphiterythritol diphosphite, N-1,3-dimethylbutyl-N'-phenyl-p-phenylenediamine, n-Octadecyl 3-(3',5'-di-t-butyl-4'-hydroxylphenyl)propionate, and mixtures thereof, and a weight ratio of antioxidant to copolymer rubber TBIR is 0.01-1:100; and the rubber auxiliary agent is a compound selected from olefin, aromatic oil, naphthenic oil, C5 resin, octadecanoic acid, calcium stearate, dolomol, nihil album, silicon dioxide, carbon black modified derivatives of the aforementioned compounds, and mixtures thereof; and a weight ratio of the rubber auxiliary agent to copolymer rubber TBIR is 1-50:100;

wherein the method is conducted in a device comprising a recovery and refining unit, a polymerization unit, a post-treatment unit, and a utility unit;

the recovery and refining unit comprises:
the refining device, to refine the butadiene, isoprene and hydrogen, and comprises a treating column;
the separation device, to separate and recover unreacted butadiene and isoprene and transport them to the polymerization reactor or to the storage tank, the separation device comprising a recovery storage tank, a gas holder, and a separate column;
a storage and preparing unit for the cocatalyst, primary catalyst and electron donor;

the polymerization unit comprises:
the batching device, comprising a metering and pumping device for the butadiene monomers and isoprene monomers, a metering and pumping device for the primary catalyst, electron donor and cocatalyst, and a metering device for the hydrogen;
the polymerization apparatus, comprising a combination of a tank polymerization reactor and a horizontal reactor in series in that order; and
a monitor and control unit that comprises:
a temperature online monitor, a pressure online monitor, a material online detector, and a material online controller,
the material online detector comprising an online viscosity detector and an online concentration detector,
the material online controller comprising a material electromagnetic valve and a computer controller;

the post-treatment unit comprises:
the termination device comprising a double screw extruder;
the extrusion and devolatilization device comprising an extruder, a granulator, a drum wind dryer, and a vacuum pump, wherein the extrusion and devolatilization device removes the unreacted monomers and mixes the polymer with the antioxidant and/or rubber auxiliary agent, and then carries out the extrusion, granulation and drying of products produced by the mixing, extrusion, granulation and drying;

a preparing and conveying device of the termination agent;

a preparing and conveying device of the antioxidant;

a preparing and conveying device of the rubber auxiliary agent; and a conveying, metering and packaging device of the polymer; and the utility unit comprises:

a cold water, hot water and/or steam pipeline apparatus, for controlling the temperature of the polymerization device; and a vacuum and high purity nitrogen apparatus that can replace the polymerization system before the polymerization and during overhaul.

2. The method for industrial production of the bulk-polymerized butadiene-isoprene copolymer rubber having a trans-1,4-structure according to claim 1, wherein the trans-1,4-structure mole content in the copolymer rubber TBIR is above 85%, the butadiene mole content within it is 0.1%-60%, the Mooney viscosity (100° C., 3+4 min) of it is 20-120, the fusion temperature is below 50° C.

3. The method for industrial production of the bulk-polymerized butadiene-isoprene copolymer rubber having a trans-1,4-structure according to claim 1, wherein a batch polymerization method or a continuous polymerization method is adopted.

4. The method according to claim 1, wherein the produced trans-1,4-butadiene-isoprene copolymer rubber has flex fatigue resistance and can be applied to fields of tires, shock absorbers, and damping materials.

5. The method according to claim 2, wherein the produced trans-1,4-butadiene-isoprene copolymer rubber produced has flex fatigue resistance and can be applied to fields of tires, shock absorbers, and damping materials.

6. The method according to claim 3, wherein the trans-1,4-butadiene-isoprene copolymer rubber produced according to this industrial method has flex fatigue resistance and can be applied to fields of tires, shock absorbers and damping materials.

7. The method for industrial production of the bulk-polymerized butadiene-isoprene copolymer rubber having a trans-1,4-structure according to claim 1, wherein the extrusion and devolatilization device comprises one or two or more extruders that can be used in series and/or parallel connection, wherein each of the one or two or more extruders is a single screw extruder, or a co-rotating twin screw extruder, or a counter-rotating twin-screw extruder, or a horizontal drying extruder, and wherein the two or more extruders can be used in series connection to reduce the violate content of copolymer rubber, and can also be used in parallel connection to increase the extruding output of copolymer rubber.

8. The method according to claim 7, wherein the produced trans-1,4-butadiene-isoprene copolymer rubber has flex fatigue resistance and can be applied to fields of tires, shock absorbers and damping materials.

* * * * *